United States Patent [19]

McDavid et al.

[11] Patent Number: 4,868,795
[45] Date of Patent: Sep. 19, 1989

[54] POWER LEVELING TELEMETRY SYSTEM

[75] Inventors: William T. McDavid, Allen; William W. Bryce, Dallas, both of Tex.

[73] Assignee: Terra Marine Engineering, Inc., Dallas, Tex.

[21] Appl. No.: 131,315

[22] Filed: Dec. 9, 1987

Related U.S. Application Data

[63] Continuation of Ser. No. 762,297, Aug. 5, 1985, abandoned.

[51] Int. Cl.$^4$ .............................................. G01V 1/16
[52] U.S. Cl. ........................................ 367/77; 455/69
[58] Field of Search .................... 367/76, 77, 65, 67; 346/33 C; 340/870.04, 870.05; 455/10, 69

[56] References Cited

U.S. PATENT DOCUMENTS

| 2,425,614 | 8/1947 | Goddard . |
| 2,454,396 | 11/1948 | Malling . |
| 2,678,998 | 5/1954 | Young, Jr. . |
| 2,877,343 | 3/1959 | Mitchell . |
| 2,896,073 | 7/1959 | Westphal . |
| 2,912,569 | 11/1959 | Shepherd . |
| 2,981,943 | 4/1961 | Dodington . |
| 3,028,489 | 4/1962 | Chasek . |
| 3,139,582 | 6/1964 | Spierling . |
| 3,151,295 | 9/1964 | Haviland . |
| 3,315,164 | 4/1967 | Ferguson, Jr. . |
| 3,332,017 | 7/1967 | Dennis, Jr. . |
| 3,415,952 | 12/1968 | Blackburn . |
| 3,662,290 | 5/1972 | Elliott . |
| 3,732,496 | 5/1973 | Boyer . |
| 3,745,464 | 7/1973 | Lee . |
| 3,806,814 | 4/1974 | Forbes . |
| 3,925,782 | 12/1975 | Anderl et al. . |
| 4,004,224 | 1/1977 | Arens et al. . |
| 4,013,961 | 3/1977 | Colebourn . |
| 4,042,906 | 8/1977 | Ezell ..................................... 367/77 |
| 4,112,412 | 9/1978 | Howlett ................................ 367/79 |
| 4,228,538 | 10/1980 | Scharla-Nielsen . |
| 4,261,054 | 4/1981 | Scharla-Nielsen . |
| 4,309,771 | 1/1982 | Wilkens . |
| 4,392,245 | 7/1983 | Mitama . |
| 4,493,063 | 1/1985 | Tims et al. ........................... 367/77 |
| 4,495,648 | 1/1985 | Giger . |
| 4,512,033 | 4/1985 | Schrock . |

FOREIGN PATENT DOCUMENTS

35569 3/1980 Japan .
8002877 12/1980 PCT Int'l Appl. .................... 367/77

Primary Examiner—Thomas H. Tarcza
Assistant Examiner—Tod Swann
Attorney, Agent, or Firm—Ross, Howison, Clapp & Korn

[57] ABSTRACT

A seismic telemetry system with automatic power leveling is comprised of a command station (10) and a plurality of remote data acquisition units (14). Each of the DAU's (14) includes an antenna (18) for receiving commands and transmitting data and is connected to a T/R switch (34). Commands are received by command receiver (48) and entered into a system control (50). A power detect circuit (52) is provided for measuring signal strength of the received carrier and this information is compared to an internal reference in the system control (50) and the power output level of the transmitter (56) is adjusted. A transmit power detect circuit (60) is provided for measuring the actual power output by the transmitter (56). This measured power level is compared in the system control (50) with the internal references to determine if the actual power output is equal to the expected power output. If not, an offset is provided to adjust for any discrepancies. The command station (10) receives data from the DAU (14) by a data receiver (36). The power of the receive signal is detected by a power detect circuit (42). This information is input to a system control (40) for comparison with an internal reference. If the power detected by the detect circuit (42) is outside of predetermined constraints, an offset is generated and transmitted as a command by a command transmitter (44) back to the select DAU (14) to provide an additional amount of offset to compensate for actual variations in the transmission of the data.

10 Claims, 4 Drawing Sheets

POWER LEVELING TELEMETRY SYSTEM

TECHNICAL FIELD OF THE INVENTION

The present invention pertains in general to telemetry systems for collecting seismic data and, in particular, to a power leveling system for adjusting the transmitted power between a central command system and remote transceivers to adjust for varying path lengths.

CROSS REFERENCE TO RELATED APPLICATIONS

This application is a file wrapper continuation of application Ser. No. 762,297, filed Aug. 5, 1985, now abandoned which is a continuation-in-part of Ser. No. 528,040, filed Aug. 31, 1983 now U.S. Pat. No. 4,663,744, issued May 5, 1987.

BACKGROUND OF THE INVENTION

Real time seismic telemetry systems require a plurality of data acquisition units (DAU) to be disposed along a seismic line for sensing seismic waves in the earth's crust. Normally, these seismic waves are artificially induced to create a wavefront that can be measured as it passes proximate the DAU's. The data that is collected is normally in analog form which is obtained from a transducer such as a seismometer. Each of the DAU's is oriented such that they take data at a plurality of points disposed remote from a central shock creating device. By examining this data, scientists can utilize analytical models of the structure of the substrata in the locale of the transducers.

In operation, the seismic telemetry system is controlled such that the DAU's are normally in a stand-by mode. When a test is to be performed, commands are transmitted from a central unit to each of the DAU's and they are "powered up". They then sample the data and transmit it along a data path to the central data receiver for processing thereof. Most telemetry systems of this type utilize high frequency radio transmission techniques for transmission through the environment. Therefore, each of the DAU's has an associated path loss between its location and the central receiving unit.

To accommodate for the varying distances between each of the DAU's and the central receiving unit, the central receiving unit is provided with a wide dynamic range to account for the various power levels that are received. The DAU disposed nearestmost the central receiver has the least transmission path loss and the DAU disposed farthest most from the central receiving unit has the largest path loss. Therefore, if the power transmitted from each of the DAU's is identical, the received power from the nearestmost DAU will be higher than the received power from the farthestmost DAU by the difference in path loss between the two. Depending upon the various associated path losses of the DAU's, the central receiver may require a relatively wide dynamic range to accommodate all of the DAU's. It would be more desirable to have the power levels transmitted from the various DAU's adjusted prior to transmission of data therefrom such that the power level of the received signal from each of the DAU's at the central receiver is essentially the same, thus requiring a lower dynamic range for the central receiver. However, it is impractical to provide a manual adjustment since the DAU's are seldom accessible for this adjustment nor are the path losses consistent, since they may vary as a result of environmental conditions. In addition, the DAU's are susceptible to varying parameters due to temperature, aging of components, etc.

In view of the above disadvantages, there exists a need for a power leveling system which is remotely activated from a centralized point, thus yielding a more versatile system.

SUMMARY OF THE INVENTION

The preset invention disclosed and claimed herein comprises a power leveling system for a seismic telemetry system. The telemetry system comprises a remote data acquisition unit which acquires data and transmits it to a central command station. The command station generates a command transmission at a predetermined power level which is received by a command receiver in the data acquisition unit. The signal strength thereof is measured and compared with internally stored reference. If a measured power level exceeds the internal reference, the power level of data transmissions from the data acquisition units to the command station is decreased by a calculated amount. The command station includes a data receiver for receiving the data transmissions from the data acquisition unit and measuring the signal strength thereof. The measured signal strength is compared with predetermined constraints and an offset is calculated if measured signal strength falls outside of these constraints. This offset is then transmitted back to the DAU and the internal reference therein offset.

In another embodiment of the present invention, the data acquisition unit includes a power detect circuit which measures the output power level of the data transmissions. This measured output power level is then compared with the expected output power level resulting from the internal calculations in the data acquisition units. If the measured power level deviates from the expectant power level by more than a predetermined value, an offset is provided to the internal reference in the data acquisition units. This compensates for variations in the operating parameters of the transmission circuits.

BRIEF DESCRIPTION OF THE DRAWINGS

For a more complete understanding of the present invention and the advantages thereof, reference is now make to the following description taken in conjunction with the accompanying Drawings in which.

DETAILED DESCRIPTION OF THE INVENTION

Figure 1:
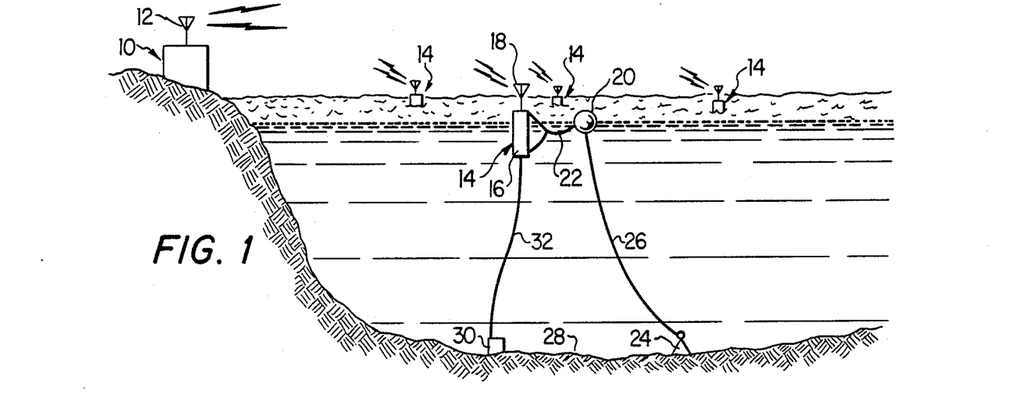
FIG. 1 illustrates a view of a seismic telemetry system with a plurality of remote data acquisition units and a centralized control station.

Referring now to FIG. 1 there is illustrated a perspective view of the seismic telemetry system of the present invention. The system comprises a command station 10 disposed on a solid location with an antenna 12 attached thereto for operation over a wireless data link. A plurality of remote data acquisition units 14 (hereinafter referred to as "DAU"'s) are disposed at select remote locations from the command station 10. Each of the DAU's 14 is comprised of a cylindrical body 16 that is operable to support electronics therein and maintain buoyancy at the surface level and an antenna 18 disposed on the portion of the body 16 that extends above the water. The antenna 18 is operable to transmit over and receive information from the wireless data link to communication with the command station 10. The cylindrical body 16 is attached to a float 20 by a cable 22. The float 20 is attached to an anchor 24 through an anchor cable 26, the anchor 24 resting upon a sea bottom 28. A hydrophone 30 also rests on the sea bottom and is attached to the DAU 14 through a sensing cable 32. The hydrophone 30 is operable to sense seismic data in the general location thereof. Although a hydrophone has been illustrated, it should be understood that any seismic transducer may be utilized, such as a geophone.

The hydrophones 30 that are attached to the DAU's 14 are laid along a seismic line such that a plurality of data points can be obtained at predetermined distances. The hydrophones 30 are then connected to an associated one of the DAU's 14. The distance between adjacent ones of the DAU's 14 is in the range of from 10 to 100 meters. At this spacing, the distance between the command station 10 and the string of DAU's 14 can be up to ten miles, but this depends upon the particular layout utilized.

Each DAU 14 transmits and receives over the data link, which is a radio frequency (RF) data link for reception at the command station 10 in order to communicate with the command station 10. Since each DAU 14 transmits data received from a separate hydrophone 30, it is necessary to distinguish the DAU's 14 at the command station. This is accomplished by utilizing discrete channels in the RF spectrum associated with each of the DAU's 14. In order to preserve dynamic range and the signal to noise ratio in the transmission system, it is necessary to have a transmission system that utilizes appropriate modulation techniques and bandwidth conservation techniques to operate in a given portion of the frequency spectrum. In the preferred embodiment, the system occupies the RF frequency spectrum from 72 MHz to 76 MHz. Although much wider portions of the spectrum can be utilized, it is not practical to do so since overcrowding of the spectrum is severe in certain areas and only certain portions are relatively free for general use. As there are many factors to consider when choosing a frequency band to operate in, such as cost, transmission properties at certain wavelengths, power efficiencies and circuit realization techniques, the practical constraints of developing a wireless telemetry system normally result in utilization of a very small portion of the spectrum, resulting in a very narrow overall system bandwidth.

In a normal seismic data acquisition system, anywhere from 72 to 240 hydrophones may be utilized. Since each hydrophone is associated with a separate DAU 14, a discrete channel must be reserved for each hydrophone/DAU combination. Therefore, up to 240 channels may have to be accommodated in the 4 MHz bandwidth. This is achieved by utilizing the appropriate modulation technique in conjunction with various bandwidth conservation techniques.

In operation, the command station 10 transmits commands on a single channel to each of the DAU's 14. These commands are received in a stand-by mode at the DAU's 14 and then the DAU's 14 are "powered up" to sense data and transmit the data back on the associated receive channels of each of the DAU's 14. This is a real time system such that a separate channel is provided for each of the DAU's 14 and data is transmitted as it is acquired. As will be described hereinbelow, the power of each of the DAU's 14 is adjusted such that the power being received at the command station 10 is within a predetermined minimum and a predetermined maximum value or "window" regardless of the distance that the DAU 14 is disposed from the command station 10. The power leveling is performed in two steps. First, each of the DAU's 14 receives the transmitted command signal from the command station 10 and measures the power thereof. This measured power is compared with a predetermined value to provide an indication of path loss. The transmission power from each of the DAU's is then adjusted accordingly. The second step of the system is to measure the power being received from the DAU's 14 at the command station 10 and comparing this received power with a predetermined value. If the power deviates by a predetermined amount, a command signal is sent back to the particular one of the DAU's 14 to adjust the power. This is in the form of an offset to the predetermined value internally stored in the DAU 14. This provides a closed loop system.

Figure 2:
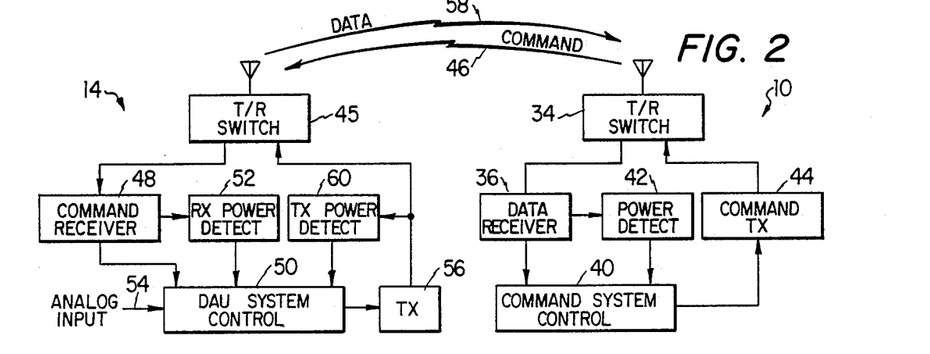
FIG. 2 illustrates a schematic block diagram of one of the DAU's and the command station illustrating the power leveling system.

Referring now to FIG. 2, there is illustrated a simplified schematic block diagram of the command station 10 and one of the DAU's 14. The command station 10 transmits commands and receives data through a transmit/receive (T/R) switch 34. The received data is input to a data receiver 36 which separates the modulated carrier signals from the various DAU's 14 and demodulates this data. This demodulated data is output to a system control 40 for processing of the data. The power of each of the DAU's 14 is sensed by a power detect circuit 42 and converted to a suitable format for input to the system control 40 for analysis thereof. The system control 40, as will be described hereinbelow, compares this signal with a predetermined reference to determine if the detected power is within predetermined constraints or window.

In order to control the system, the command station 10 provides a command transmitter 44 for transmitting commands on a predetermined frequency to all of the DAU's 14 simultaneously. This is represented by a command signal path 46. The system control 40 is interfaced with the command transmitter 44 to provide the commands for transmission to DAU's 14 and also control the initiation of transmission.

Each of the DAU's 14, of which one is illustrated, have a T/R switch 46 interfaced with the antenna 18. In the receive mode, the T/R switch 45 receives the command signal along the path 46 for receipt by a command receiver 48. The command receiver 48 outputs a demodulated signal to a DAU system control 50. The DAU system control processes the data and controls the operation of the DAU 14 in response thereto. The command receiver 48 also outputs a signal strength to a receive power detect circuit 52 to determine the signal strength of the received command signal. This will provide an indication of distance from the command station 10 since the command transmitter 44 outputs a predetermined power level. This detected signal is analyzed by the DAU system control 50 and compared with a predetermined reference.

In the transmit mode, the DAU system control 50 receives analog input data on a line 54 and modulates a radio carrier with this data for output to a transmitter 56. The transmitter 56 is interfaced with the T/R switch 34 for transmission along a data path 58 back to the command station 10. The DAU system control 50 attenuates the signal input to the transmitter 56 to adjust the output power therefrom to a predetermined level in accordance with the signal strength of the command signal received along the path 46. In order to ensure that the transmitter 56 is outputting the correct power, the output power thereof is input to a transmit power detect circuit 60 and the level thereof measured and input to the DAU system control 50 to provide localized feedback. The DAU system control 50 can then adjust for any parameter variations in the transmitter 56.

In operation, a command signal is transmitted to each of the DAU's 14 when the system is initially installed to provide a power level reference to each of the DAU's 14. Depending upon the distance that the DAU's 14 are disposed from the command station 10 and the path loss therebetween, this power level reference will vary. This level is sensed and a calculation performed within each of the DAU's 14 to determine an appropriate amount of attenuation to insert in the data transmission path. This attenuation is then inserted into the transmission path by decreasing the gain of the transmitter chain. In order to accomplish this task, information must be stored internal to the DAU 14 regarding the parameters of the transmitter, the parameters of the receive power detect circuit, the parameters of the transmit power detect circuit and also the power of the transmitted signal that was emitted from the antenna 12 on the command station 10. With this information, a correct amount of attenuation can be calculated and inserted into the transmission path prior to transmitting data from the DAU 14. However, if any of the prestored parameters vary, this variation must be corrected for in order to ensure that an appropriate power level is provided for transmission of data back along the data path 58. For example, if the power output level of transmitter 56 varies as a function of time such that the power level output therefrom decreases by a factor of 3.0 db, a 50% decrease in power will result. This is compensated for by the transmit power detect circuit 60 which makes an actual measurement of the output power. Therefore, with th use of the transmit power detect circuit 60, variations in the operating parameters of transmitter 56 can be removed from consideration. However, if the conversion parameters of the transmit power detect circuit 58 vary such that an inaccurate measurement of power is made, the actual power level transmitted will vary from the expected transmitted power. In a similar manner, if the power output by the command station 10 varies during the initial power set up phase in the DAU 14, the actual path loss compensated for will be inaccurate and the power arriving at the command station 10 will be either too high or too low. This is in effect an open loop system.

In order to compensate for an open loop system, the command station 10 measures the received power level from each of the DAU's 14 and compares this received power level with a predetermined value. If this value exceeds predetermined constraints, an adjustment factor or offset is transmitted back to the DAU 14 and its internal stored parameters are adjusted or offset in order that subsequent power level settings can accommodate for the various errors. For example, if the transmit power detect circuit 60 had an error of −3.0 db in the measurement of the output power from the transmitter 56, this would result in a 50% decrease in power level along the data path 58 arriving at the command station 10. This would be detected at the command station 10 and an offset factor transmitted back along the command signal path 46 to provide the offset to the DAU system control 50. Thereafter, the transmitter output 56 would always be increased by a factor of 3.0 db for each power level setting. With the system of the present invention, both a localized power level setting can be performed at each DAU and a secondary adjustment can be made on a system wide basis.

By utilizing the system of the present invention, each of the DAU's 14 operate independently to set the power levels of data transmission. This reduces the requirements on the command station to set the power levels of all of the DAU's 14. For example, if the command station 10 set the power level of each DAU 14, separate command signals would have to be generated for each DAU 14 and sequentially transmitted thereto. In addition, the initial setting would require the DAU's 14 to operate at full power which could cause some errors due to overlapping of adjacent channels. The present invention allows the command station to "fine tune" the power levels rather than provide complete power leveling.

Figure 3:
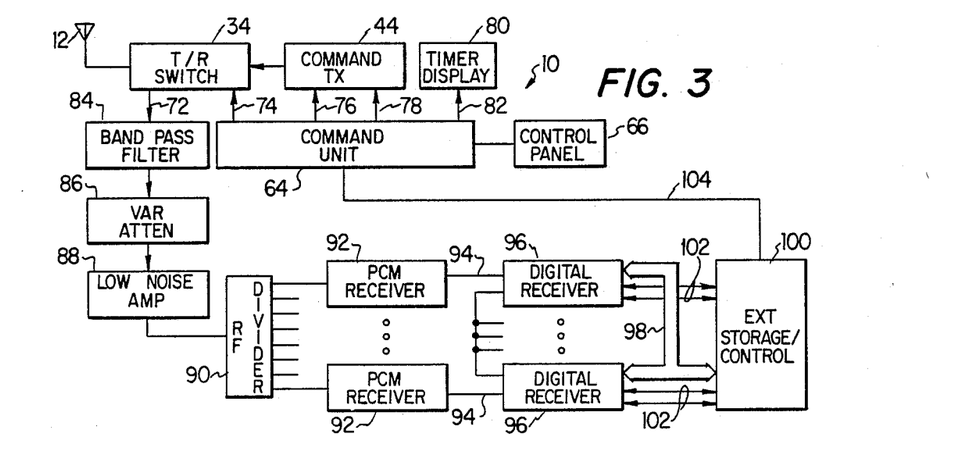
FIG. 3 illustrates a schematic block diagram of the command station.

Referring now to FIG. 3, there is illustrated a more detailed block diagram of the command station 10, wherein like numerals refer to like parts in the various figures. The command station 10 is comprised of a command unit 64 which has a control panel 66 connected thereto. The command unit is operable to generate a plurality of commands that control the operation of the system. The antenna 12 is connected to one port of the T/R switch 34 and transmitter 44 is connected to an inport thereof. The T/R switch 34 in the transmit mode is operable to receive a signal from the transmitter 44 and output it to the antenna 12 and, in the receive mode, to receive an RF signal from the antenna 12 and route it to an output port 72 on the T/R switch 34. The output port 72 comprises the received data. A control line 74 is connected between the command unit 64 and the T/R switch 34 to provide the control signal therefor to control which mode the T/R switch 34 is in. The transmitter 44 has data input thereto through a data line 76 and control signals therefore are input through a control line 78. The command unit 64 determines the data which is to be modulated onto the transmitter 44 and inputs the data along lines 76 and, in addition, determines whether the transmitter 44 is to be activated by signals on the control line 78. A timer display 80 is also connected to the command unit 64 through a signal line 82 to measure the on time of the DAU's 14.

The receive signal from the T/R switch 34 is passed through the output port 72 to a bandpass filter 84. The bandpass filter 84 is generally a system filter that rejects all frequencies outside of the operating band that is allocated to the system, and passes all frequencies within the band with minimal insertion loss therein. The output of the filter 84 is input to a variable attenuator 86 to select an attenuation therefor. The variable attenuator 86 allows the dynamic range of the system to be adjusted such that RF signals from all of the DAU's 14 can be accommodated. High RF levels may result from the command station being disposed relatively close to the seismic data line. The output of the variable attenuator is then input to a low noise amplifier (LNA) 88 to prevent successive system elements from severely degrading the system sensitivity.

The output of the LNA 88 is input to a power divider 90 which divides the signal output by the LNA 88 for output from a plurality of output ports. Since each of the DAU's 14 operates on a discrete channel at discrete frequency, it is necessary to provide a discrete receiver for each of the DAU's 14. This is accomplished with the power divider 90.

Each of the outputs of the power divider 90 is connected to an individual Pulse Code Modulation (PCM) receiver 92. Each of the PCM receivers 92 is tuned to one of the discrete frequencies for receiving the transmitted data from the associated one of the DAU's 14. PCM receiver 92 selects the appropriate frequency, demodulates the carrier and decodes the data. The output of the PCM receiver 92 consists of PCM data. This data is transmitted along a PCM data signal line 94 as a digital bit stream in a non return to zero format (NRZ) to a digital receiver 96. The digital receiver 96 obtains synchronization with the serial bit stream and outputs the proper sequence of digital words that represent the digital data. The digital words are output on a data bus 98 that is multiplexed between the digital receivers 96 that are associated with each of the PCM receivers 92. Data bus 98 is also connected to an external storage/control device 100 that is operable to store the data output by the digital receiver 96 and also output control signals for various functions which constitute the commands. These various other functions are either output as part of the data bus 98 or on signal lines 102. The external storage/control device 100 is in communication with the command unit 64 through a signal line 104.

Figures 4, 5:
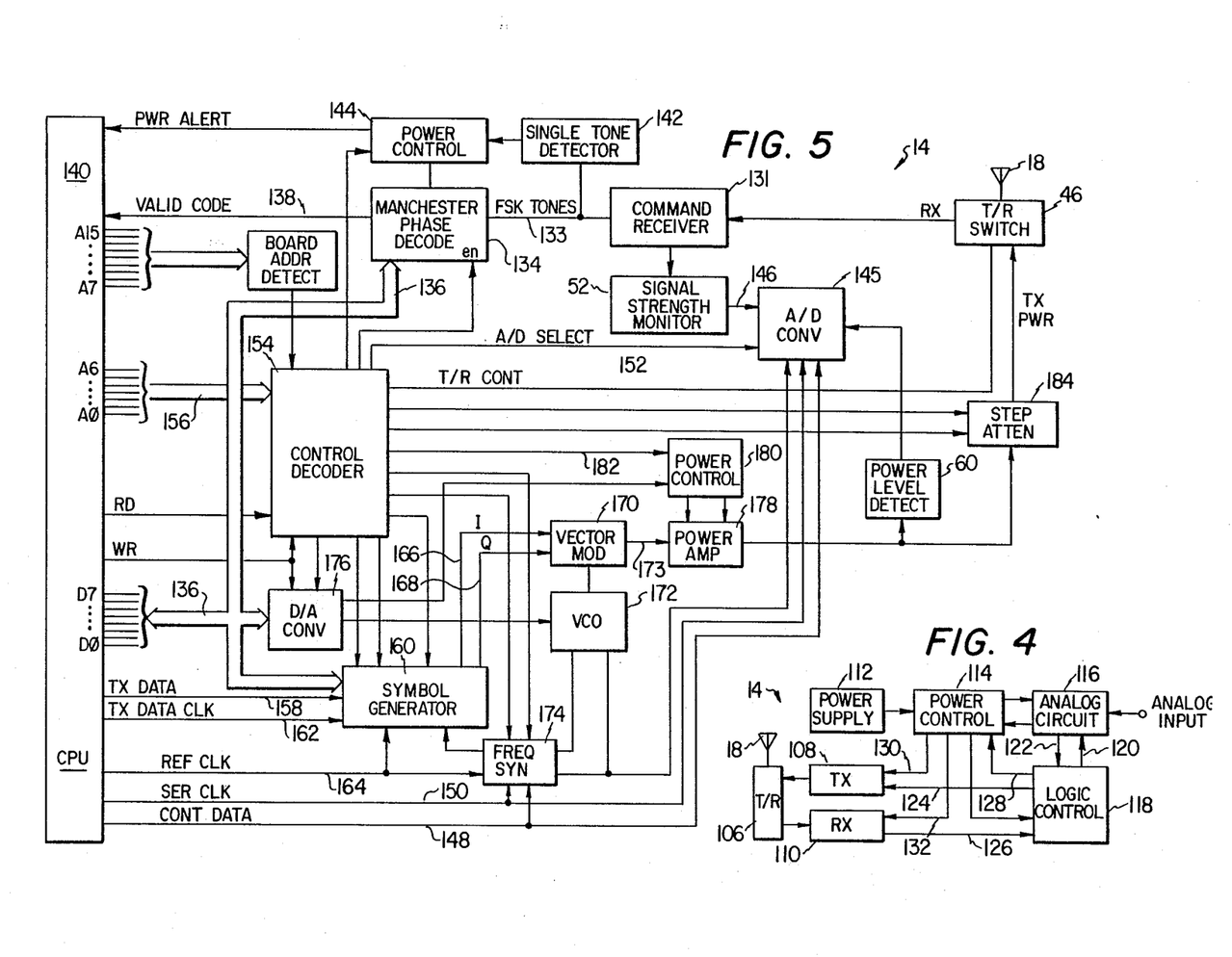
FIG. 4 illustrates a schematic block diagram of the DAU.
FIG. 5 illustrates a detailed schematic block diagram of the DAU.

Referring now to FIG. 4, there is illustrated a block diagram of the DAU 14. The antenna 18 is connected to a T/R switch 106 to selectively connect a transmitter 108 or receiver 110 to the antenna 18. When the transmitter 108 is connected to the antenna 18, encoded data is transmitted over the data link to the command station 10 and, when the receiver 110 is connected to the antenna 18, data from the command station 10 is received by the DAU 14.

A power supply 112 is provided to provide power to the DAU 14. This is normally in the form of batteries. The power supply 112 is connected to a power control circuit 114 which controls distribution of power from the power supply 112 to the various components on the board. Each of the DAU's 14 has various modes which, in order to conserve power do not operate at all times. An analog circuit 116 is connected to the power control circuit 114 and to an analog input which is connected to the hydrophone 30. The analog circuit 116 basically processes the analog data. A logic control circuit 118 is provided that contains the internal clock of the DAU 14 and the processing circuitry to convert the analog signal into digital words. This is accomplished with an analog to digital (A/D) converter which converts samples at the sampling rate required to obtain the proper system response. The analog data is digitized to the desired resolution and in the appropriate format for input to the transmitter 108.

The logic control circuit 118 is connected to the analog circuit 116 through signal lines 120 and 122. Processed digital data is output on a signal line 124 to transmitter 108 for modulation on the RF carrier. Data received by the receiver 110 is input to logic control circuit 118 on a signal line 126. A control line 128 is connected between the logic control circuit 118 and power control circuit 114 to provide signals therebetween for control of the receiver 110 and transmitter 108. To conserve energy, control lines 130 and 132 are connected to transmitter 108 and receiver 110, respectively, from the power control circuit 114, which controls the power thereto such that transmitter 108 is turned on only during transmission of data and receiver 110 turned off during that time whereas receiver 110 is turned on only during reception from the data link with the transmitter 108 turned off at that time.

Referring further to FIGS. 1–4, the general system operation will be described. To conserve power, DAU's 14 have a standby mode and a data mode. In the standby mode, part of the receivers 110 are turned on to "listen" to the data link for transmission from the command station 10. In the preferred embodiment, all DAU's 14 have their receivers 110 tuned to a single frequency. In this manner, they are all "listening" for the same signal. This signal is transmitted by the command station 10 to indicate to all of the DAU's 14 that data is about to be taken. Since the data taken by the hydrophones 30 is normally in response to artificially created seismic shocks, it is not necessary to have DAU's 14 running until just prior to creation of the shock. When the receiver 110 receives the initial signal, the remaining portions of each of the DAU's 14 are put into a "data ready" mode. In this mode, DAU's 14 are able to receive various types of data indicating to them the manner in which they are to operate such as the time interval over which the DAU's 14 operate, when they should "power up" and when they should transmit data. In addition, power level is also measured, as described above with reference to FIG. 2.

After a signal is received from the command station 10 to prepare the DAU's 14, portions thereof are activated such that power is provided to the appropriate circuits to transmit data. A status code is initially sent by each DAU 14 to indicate to the command station 10 various parameters of the DAU 14 such as internal voltages, unique code numbers and even indications that the internal battery has a low voltage level or that water is inside the cylindrical body 16 of DAU 14. After the status signal is transmitted, a serial bit stream is transmitted to the command station 10 which decodes the data and stores it.

Referring now to FIG. 5, there is illustrated a schematic block diagram of DAU 14, wherein like numerals refer to like parts in the various figures. The receive signal from the T/R switch 34 is input to a frequency modulated (fm) receiver 131. The fm receiver 131 outputs a signal indicitive of the signal strength and also outputs the detected frequency shift key (FSK) tones onto a line 133. Line 133 is input to a Manchester phased decoder 134 which is of the type HD-6408 manufactured by Harris Semiconductors. The Manchester decoder 134 outputs the decoded data onto a data bus 136. When a valid tone is present, a valid tone signal is output on a line 138 and input to a central processing (CPU) 140. The CPU 140 utilizes a microprocessor of the type 80C31 manufactured by Intel Corporation and associated memory and control circuits. The memory circuits may be read only memories (ROM's), random access memories (RAM's) or a combination of both.

The detected FSK tones on the line 133 are also input to a single tone detector 142 which is connected to a power control circuit 144. The power control circuit 144 outputs a signal to the Manchester decoder 134 and also to the CPU 140. The power control circuit 144 is operable to sense a command signal received by the receiver 131 and recognizable by the tone detector 142 to power up the DAU 14 in response thereto. In this manner, unnecessary functions such as data processing, power detection, etc. can be "powered down" when the system is not being utilized. By placing an appropriate command on the command link, the DAU 14 can be placed in an active mode.

The signal strength of the received signal is measured by a power detect circuit 52 to output an analog voltage to a four channel eight bit serial A/D converter on a line 146. The A/D converter 145 converts the data to a serial data stream which is input to the CPU on a serial data line 14B. The A/D converter 145 is controlled by serial clock received from the CPU on a serial clock line 150 and also by an A/D select signal received on a line 152 from a control function decode circuit 154. The control function decode circuit 154 is addressed by the addresses AO–A6 on the CPU 140 and input thereto on a seven bit low address bus 156. In the receive mode, the A/D select line 152 selects the appropriate input for power detect circuit 52 to provide an indication of the signal strength of the received signal.

In the transmit mode, serial transmit data is generated by the CPU 140 and output on a serial transmit data line 158 to a symbol generator 160. The symbol generator 160 receives a transmit data clock on a line 162 and also receives input data from the CPU 140 from the data bus 136. Only he two lower order bits of the data are utilized by the symbol generator 160. The symbol generator 160 also receives a reference clock on a line 164 from the CPU 140 and control signals from the control decoder 154. The symbol generator 160 is operable to generate quadrature phase components (I) and (Q) on lines 166 and 168, respectively. These quadrature components are input to a vector modulator 170 to provide a quadrature phase shift key modulated R/F carrier on a line 172. The vector modulator is of the type P-CPM-70 manufactured by Olektron. A voltage control oscillator is utilized to generate a frequency between 66 MHz to 82 MHz in response to a voltage output by a frequency synthesizer 174. A frequency synthesizer 174 receives a signal from the reference clock line 164 and also receives control signal from the control decoder 154. The course tuning of the VCO 172 is provided by a dual digital-to-analog (D/A) converter 176 which is interfaced with the data bus 136. The symbol generator 160 and the frequency synthesizer 174 are further described in Pat. Nos. 4,663,744 and 4,745,628 issued on May 5, 1987 and May 17, 1988, respectively. However, it should be understood that the system of the present invention can be utilized with any type of modulation scheme such as that described in U.S. patent application Ser. No. 528,040, filed Aug. 31, 1983. It is only important that data is modulated onto an RF carrier and that RF carrier generated at a predetermined frequency.

The modulated RF signal is input to a variable power RF amplifier 178 which operates over a bandwidth from 66 to 82 MHz. The output power of the amplifier 178 is controlled by a power control circuit 180 which receives an analog output signal from the D/A converter 176 in response to an appropriate digital signal input thereto and an appropriate control from the control decoder 154 to set the power level of the amplifier 178. In addition, a signal for maximum power is input directly from the control decoder 154 along a line 182 to set the power at maximum if necessary.

The output of the amplifier 178 is input to both a step attenuator 184 and also the power level detector 60. The power level detector 60 has the output thereof connected to one of four inputs of the A/D converter 145 to allow conversion to a serial data stream and input to the CPU 140 along the line 148. This allows the output of the power amplifier 178 to be directly measured by the CPU 140. The step attenuator 184 provides multiple steps of attenuation between the amplifier 178 and the T/R switch 34. This attenuation provides a course adjustment for the overall power reduction provided by the power control circuit 180 and the power amplifier 178. In combination, the amplifier 178 and step attenuator 184 provide an adjustable power output that is determined by the CPU 140.

In operation, the DAU 14 is operable to operate in a standby mode and a data transmission mode. In the standby mode, the FM receiver is turned on to receive command signals indicating that the DAU 14 should power up. This is facilitated by the single tone detector 142 and the power control circuit 144. In response to receiving the signal, the system is powered up to receive further command signals through the Manchester decoder 134.

During reception of commands from the command station 10, the signal strength monitor 52 outputs data to the A/D converter 145 to provide the CPU 140 with information regarding the signal strength. This received signal strength is then compared with a predetermined reference to determine the amount of attenuation necessary to reduce the power output of the amplifier 178. For example, if the received power is 3db above the reference value, this indicates that the output power from the power amplifier 178 should be reduced by 3db or by 50%. This indicates that the DAU 14 is closer to the command station 10 than the nominal reference distance. The CPU 140 then outputs an address on the bus 156 to the control decoder 154 to latch a value into the D/A converter 176 for output to the power control 180 to set the output power of the power amplifier 178.

After setting the power level, data is then sampled in real time and the symbol generator 160 and vector modulator 170 generate a modulated RF carrier on the line 173. In order to ensure that the power amplifier 178 is outputting the appropriate power, the actual output thereof is sampled with the power level detector 60 and converted to a serial control data stream by the A/D converter 145 for input to the CPU 140. The CPU 140 then compares this data with the predetermined reference to determine if the offset of the power amplifier 178 has provided the correct output. If not, an additional offset is calculated and new data is input to the D/A converter 176 for output to the power control circuit 180 to further adjust the power level of the power amplifier 178.

Since the power amplifier 178 has a predetermined power range which may be adjusted, it may be necessary to add some attenuation with the step attenuator 184. This provides a wider adjustment range for the amplifier 178. For example, if the power level of the amplifier 178 can only be adjusted down by a factor of 6 db and CPU 140 determines that the attenuation required is 9 db, it will be necessary to add 3db of attenuation with the step attenuator 184.

The power detect circuit 52 allows the CPU 140 to measure received power from the command station 10 and determine the path loss between the command station 10 and the DAU 14. This determination is made by outputting a predetermined power at the command station 10 and comparing the received value with its expected transmitted value. A digital word is then input to the D/A converter 176 to output an appropriate level corresponding to the desired output power from the power amplifier 178. However, the characteristics of the power amplifier 178 can change as a result of both time, temperature, etc. Therefore, the power level detector 60 is utilized to obtain an internal feedback of the actual transmitted power such that an offset can be provided to account for a deviation in operating parameters of the power amplifier 178. This provides for a more accurate determination of transmitted power from the DAU 14.

Referring further to FIG. 2 and to FIG. 5, the command station 10 also measures the signal strength of the received data RF carrier and compares it with a predetermined reference, as described above. If this power is outside of predetermined constraints, this indicates that some parameter of the system has varied and is not compensated for in the power setting of the DAU 14. One example of this would be a variation in power output from the command station 10 on the command frequency. By measuring the actual received power from each of the DAU's, a command can then be sent back to each of the DAU's with an offset, if necessary. This offset would then be stored at the associated one of DAU's 14 and used to offset the reference value in the CPU 140.

For example, if a system is designed wherein the maximum power output by the DAU 14 is 1 dbm and the sensitivity of the data receiver on the command station 10 were −100dbm, this system would tolerate approximately 100db of path loss. However, if the DAU 14 were disposed closer to the command station 10 such that the path loss were only a 50 db, this would require the data receiver at the command station 10 to have a dynamic range that would be sensitive to both signals at a level of −100 dbm and signals at −50 dbm. In addition, the filters between adjacent channels would have to filter out the spectral content of one channel that overlapped into another channel. Therefore, it is desirable that the signal arriving at the command receiver be at approximately the same level within, for example, approximately ±/ 10 db. Therefore, the signal arriving at the command receiver would have a value between −80 dbm to −100 dbm.

To facilitate this power leveling at the DAU 14, the command station 10 transmits a signal of, for example, +10 dbm to each of the DAU's 14, which signal strength is measured. If the signal strength is between −90 dbm to −70 dbm, representing a path loss between 100 db to 80 db, respectively, the DAU 14 will transmit full power. However, if the signal strength is above −70 dbm, the DAU 14 will adjust its power output. If all parameters of the DAU 14 are operating correctly, the power arriving at the data receiver 36 and the command station 10 will be between −100 dbm to −80 dbm. However, if some parameter of the DAU 14 has been altered such as an increased loss in the T/R switch 34 of the DAU 14, a slight variation in the step attenuator 184, etc., the output power of the DAU 14 may be less than expected from the calculations of the CPU 140. To compensate for this, the command station 10 measures the power and transmits back an offset value. For example, if the T/R switch 34 had an unexpected loss of 10 db, it will be necessary to offset the power setting of the DAU 14 by a positive 10 db. If, alternatively, the power output by the command station 10 were decreased by 10 db, this would also result in an erroneous calculation of path length by the CPU 140. By measuring power output by each of the DAU's 14, an appropriate offset can be sent back to the DAU's 14 without having to compensate for the various components which can cause power level variations from the transmit end of either the command station 10 or the DAU 14. Therefore, the closed loop system of the present invention allows for an independent determination at the DAU 14 with a secondary determination and possible offset at the command station 10. This ensures that the received power at the data receiver 36 is within a predetermined set of constraints.

Figures 6, 7, 8, 9:
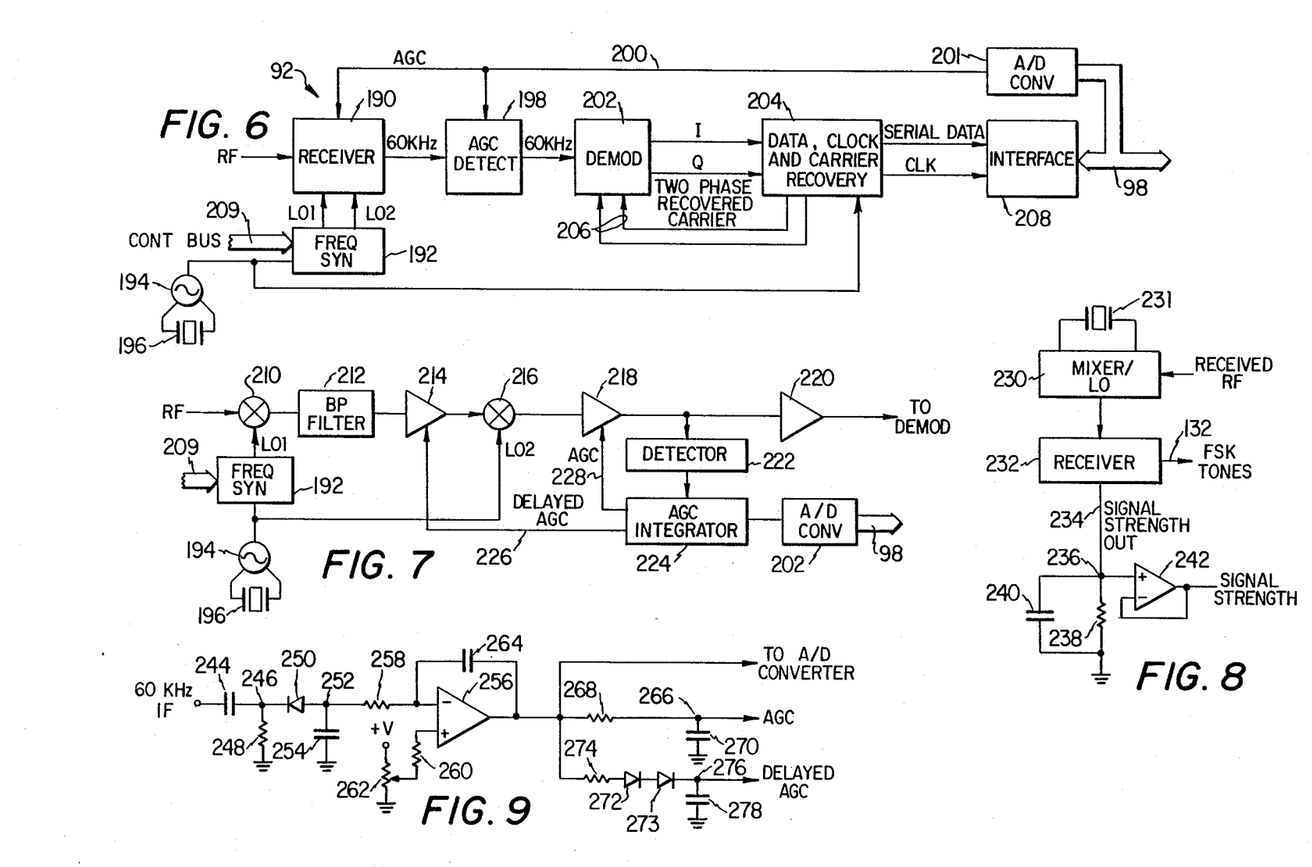
FIG. 6 illustrates a schematic block diagram of the PCM receiver.
FIG. 7 illustrates a schematic block diagram of the data receiver in the PCM receiver.
FIG. 8 illustrates a schematic diagram of the signal strength monitor circuit of the DAU.
FIG. 9 illustrates a schematic diagram of the signal strength monitor of the PCM receiver in the command station.

Referring now to FIG. 6, there is illustrated a schematic block diagram of the PCM receiver 92 of FIG. 3. The RF signal which is output by the RF divider 90 is input to a dual conversion receiver 190 which converts a selected band of RF frequencies down to an intermediate frequency (IF) of 60 kHz. The receiver 190 receives its reference local oscillator signals from a frequency synthesizer 192 which outputs a first local oscillator signal and a second local oscillator signal. The frequency synthesizer 192 receives a reference signal of 10.8 MHz from a crystal oscillator 194 having a crystal reference 196.

The output of the receiver 190 is input to an automatic gain control (AGC) detect circuit 198 which outputs an AGC gain control voltage on an AGC line 200. The AGC voltage is input to the receiver 190 to control the gain thereof. The AGC voltage is also representative of the signal strength and this voltage level is fed to an A/D converter 201, the output of which is connected to the data bus 98 for input to the storage/control device 100 of FIG. 2.

The output of the AGC detect circuit 198 is input to a demodulator 202 which demodulates the quadrature components of the QPSK signal for input to a data clock and carrier recovery circuit 204. The two phase recovery carrier is input back to the demodulator circuit 202 on lines 206. The demodulator 202 and data clock and recovery circuit 204 are any conventional QPSK demodulation circuitry. The output of the recovery circuit 204 is input to a framing, timing and bus interface circuit 208 wherein serial data is input to the interface circuit 208 and also a clock signal. The output of the interface circuit 208 is connected to the data bus 98.

Referring now to FIG. 7, there is illustrated a more detailed schematic block diagram of the receiver 190 and the AGC detect circuit 198 of FIG. 6. The RF signal is input to a first mixer 210 which has input to the local oscillator input thereof the first LO output of the frequency synthesizer 192. This signal is between the frequencies of 76.0 MHz to 92.0 MHz. The control signals are received along the control bus 209 to determine the frequency of frequency synthesizer 192.

The output of the mixer 210 is input to a bandpass filter 212 which is a crystal filter having a bandwidth of approximately 9 kHz. The output of the bandpass filter is input to an IF amplifier 214. IF amplifier 214 has a gain of approximately 50 db with an AGC range of approximately 60 db. The output of IF amplifier 214 is input to a second mixer 216, the local oscillator input of which is connected to the output of the 10.8 MHz crystal oscillator 194. This is the second level of conversion whereas the first mixer 210 provides the first level of conversion. The output of second mixer 216 provides a 60 kHz frequency which is input to a second IF amplifier 218 which has a gain of approximately 50 db and an AGC range of approximately 60 db. The output of the amplifier 218 is input to a 60 kHz active filter/amplifier 220 which provides approximately 18 db of gain over the bandwidth of 21 kHz to filter out unwanted frequencies. The output of the amplifier 220 is input to demodulator 202.

The output of the IF amplifier 218 is input to a signal strength detector 222 to detect the signal strength. The detected signal strength is then input to an AGC integrator 224 to provide a representative level. The AGC integrator 224 outputs a delayed AGC on a line 226 and a normal AGC on a line 228. The delayed AGC is input to the AGC input of the IF amplifier 214 and the normal AGC is input to the AGC input of the IF amplifier 218. In addition, the AGC integrator 224 has an output connected to the input of the A/D converter 202 to provide an interface with the data bus 98. The AGC level output by the AGC integrator 224 to control the AGC levels of the IF amplifiers 214 and 218 is proportional to the signal strength That is, as signal strength increases, the AGC signal level changes also. This AGC signal may be either a current or a voltage, depending upon the control signal required for the IF amplifiers 214 and 218.

Referring now to FIG. 8, there is illustrated a schematic block diagram of the FM receiver 131 and the power detect circuit 52 of FIG. 5. The FM receiver 131 is comprised of a two part integrated circuit which utilizes a mixer/local oscillator 230 which has the input thereof connected to the received output of the T/R switch 34. The output of the mixer/LO 230 is input to an integrated receiver 232 which outputs the FSK tones on the line 132. In the preferred embodiment, the mixer/LO 230 is of the type NE602 manufactured by Signetics Corporation and requires a crystal 231 to establish a local isolator frequency. The receiver 232 is of the type NE604 also manufactured by Signetics Corporation. The receiver 232 provides a signal strength output or a carrier strength output on a line 234 which is connected to a node 236. A resistor 238 and a capacitor 240 are connected together in parallel between the node 236 and ground. The node 236 is connected to the positive input of an operational amplifier (op amp) 242 which is configured as a voltage follower. The output thereof provides the signal strength and is input to the A/D converter 145.

Referring now to FIG. 9, there is illustrated a schematic diagram of the signal strength detector 222 and AGC integrator 224 of FIG. 7. The 60 kHz IF output by the op amp 218 is input to one side of a capacitor 244, the other end of which is connected to a node 246. A resistor 248 is connected between node 246 and ground. A diode 250 has the cathode thereof connected to the node 246 and the anode thereof connected to a node 252. A capacitor 254 is connected between the node 252 and ground. The node 252 is connected to the negative input of an op amp 256 through a resistor 258. The positive node of the op amp 256 is connected through a resistor 260 to the wiper of a potentiometer 262. The potentiometer 262 is connected between ground and a positive voltage supply. A capacitor 264 is connected between the negative input of the op amp 256 and the output thereof to form an integrator.

The capacitor 244, resistor 248, diode 250 and capacitor 254 form the detector 222 and the op amp 256 and capacitor 264, with associated circuitry, form the AGC integrator 224. Therefore, the signal at the node 252 is the detected voltage and the signal at the output of the op amp 256 is the integrated AGC voltage.

The output of the op amp 256 is connected to a node 266 through a series resistor 268. A capacitor 270 is connected between the node 266 and ground. The node 266 comprises the AGC voltage that is input to the IF amplifier 218. The output of the op amp 256 is connected to the anode of the diode 272 through a series resistor 274. The cathode of the diode 272 is connected to the anode of the diode 274, the cathode of which is connected to a node 276. A capacitor 278 is connected between the node 276 and ground. The node 276 comprises the delayed AGC signal which is input to the AGC input of the IF amplifier 214. The output of the op amp is also connected to the input of the A/D converter 201.

Figure 10:
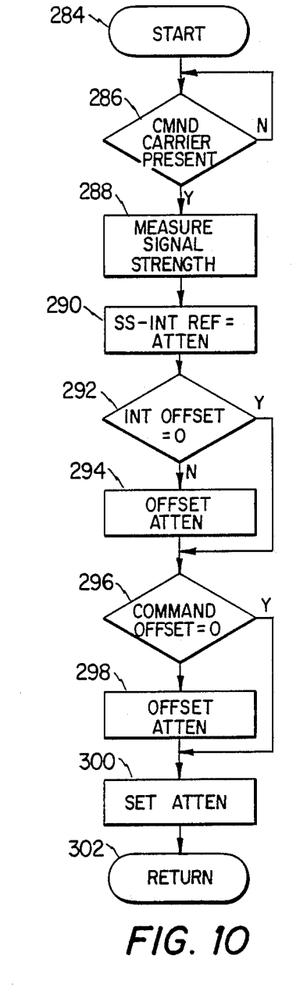
FIG. 10 illustrates a flow chart for setting the attenuation in the DAU.

Referring now to FIG. 10, there is illustrated a flow chart for setting a desired attenuation in the DAU 14. The flow chart is initiated at a start block 284 and proceeds to a decision block 286 to determine if a command carrier is present at the command receiver 131. If no current is present, the program loops back around to the input of the decision block 286 along the "N" path thereof. If the carry is present, the program flows along the "Y" path to a function block 288 to measure the signal strength with the power detect circuit 52 and the A/D converter 145. After the signal strength is measured, the program flows to a function block 290 to calculate the attenuation. The attenuation is calculated by the difference between the measured signal strength "SS" and the internal stored reference in the memory of the CPU 140 "INT REF". For example, if the measured signal strength is 20 db above the internal reference, this will indicate that 20 db of attenuation is required.

After the attenuation has been calculated, the program flows to a decision block 292 to determine if the internal offset is equal to zero. The internal offset is the offset required to compensate for variations in the output power of the variable power RF amplifier 178, as described above with reference to FIG. 5. In order to store the internal offset, the power level detector 60 measures the expected output power and compares it against the internal reference to determine if the appropriate power is output by the power amplifier 178. If there is a discrepancy in the power output, this would indicate that the parameters of the amplifier 178 have drifted with time or temperature and must be compensated for. An internal offset is then calculated and stored as such if the internal offset is zero, the program flows along the "Y" path and if the internal offset is equal to greater than zero, the program flows along the "N" path to a function block 294 to offset the attenuation by the internal offset. Both the "Y" path and the output of the function block 294 then flow to a function block 296 to determine if the command offset is equal to zero. The command offset is the offset required to adjust the power output of the DAU 14 in accordance with signals received from the command station 10. These signals are received if there is some discrepancy at the command station of the received power as compared to an internally stored reference in the command station 10. If the stored command offset is not equal to zero, the program flows along the "N" path to a function block 298 to offset the attenuation by the stored command offset. If the command offset is equal to zero, the program flows along the "Y" path to the output of the function block 298, both of which are input to a function block 300 to set the attenuation of the power amplifier 178 and the step attenuator 184. As described above with reference to FIG. 5, the step attenuator 184 is combined with the power amplifier 178 to set the output power level from the DAU 14. This is necessary since the power range of the amplifier 178 is limited. After the attenuation is set, the program flows to a return block 302 to return to the operating program.

Figure 11:
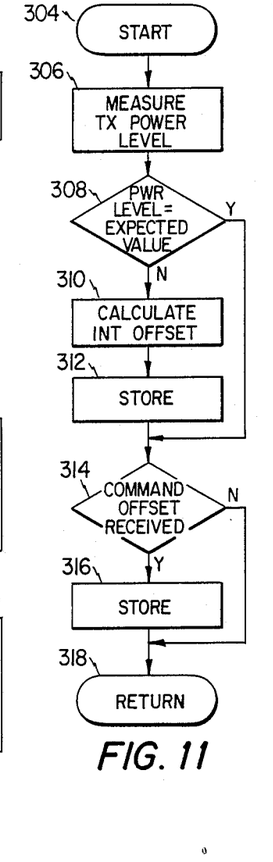
FIG. 11 illustrates a flow chart for calculating and storing offsets with the various power leveling stages.

Referring now to FIG. 11, there is illustrated a flow chart for calculating and storing the command and internal offsets. The program is initiated at a start block 304 and then proceeds to a function block 306 to measure the transmit power level to the power level detectors 60 at the DAU 14. The program then flows to a decision block 308 to determine if the power level is equal the expected value as determined by the calculated attenuation. If not, the program flows along the "N" path to a function block 310 to calculate the internal offset necessary to output the appropriate level. The program then flows to a function block 312 to store this internal offset. If the power level is equal to the expected value, thus indicating no variations in the output power of the amplifier 178, the program flows along the "Y" path from the decision block 308 to the input of a decision block 314, which also receives the output of the function block 312. The decision block 314 determines if the command offset has been received from the command station 10. If it has been received, the program flows along the "Y" path to a function block 316 to store the command offset and then proceeds to a return block 318. If no command offset has been received, the program flows along the "N" path to the return block 318.

Figure 12:
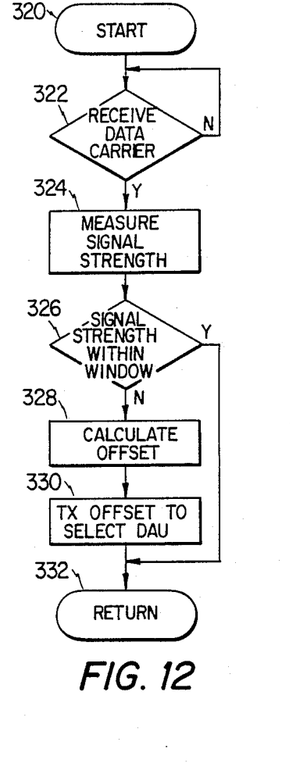
FIG. 12 illustrates a flow chart for calculating the offset in the command station.

Referring now to FIG. 12, there is illustrated a flow chart for the command station 10 in determining whether a command offset should be transmitted to an appropriate one of the DAU's 14. The program is initiated at a start block 310 and then proceeds to a decision block 322 to determine if a received data carrier is present. If not, the program loops back around to the input along the "N" path and, if a data carrier is present, the program flows along the "Y" path thereof to a function block 324 to measure the signal strength. Once the signal strength is measured in the appropriate PCM receiver associated with that DAU channel, the program flows to a decision block 326 to determine if the signal strength is within a predetermined window. As described above, the receiver has a predetermined sensitivity. For example, the sensitivity of the receiver may be approximately −100 dbm. Therefore, it would be desirable to have the receive signal between −85 dbm to −95 dbm. If the signal strength is too low, it will be desirable to increase the signal strength such that it is within the window or, if it is above −85 dbm, to decrease the signal strength. In this manner, a situation will not exist wherein two adjacent channels have received signals that vary in signal strength by a large amount. This large variation could result in "spill over" of a portion of the stronger signal into the channel of the weaker signal, thus decreasing the signal to noise ratio of the weaker channel.

If the signal strength is outside the window, the program flows along the "N" path from the decision block 326 to a function block 328 and an offset is calculated to bring the power level back into the window. After the offset is calculated, the program flows to a function block 330 to transmit a command with the offset information contained therein. This command is transmitted to a select data acquisition unit by transmitting an appropriate sequence of commands. These commands are received by the command receiver 131 and then input to the Manchester phase decoder 134. In the preferred embodiment, various commands can be transmitted to the DAU's. One command received by all the DAU's 14 would be a command indicating that the next word received will be an address for select ones of the DAU's 14. Therefore, the first command would be received and then the next command word would be indicitive of a select address. Once the address is selected, the command words following would be data words such as the command offset. After the command offset has been transmitted to the select DAU, the program would flow to a return block 332. If the signal strength were within the window, the program would also flow to the return block 332 along the "Y" path from the decision block 326.

The command station 10 transmits the command offset as a secondary power adjustment. The primary power adjustment is performed in the DAU by sensing the received signal strength from the command transmitter at the command station 10. However, this would still be an "open loop" system since the purpose is to adjust the transmit power output from the DAU 14 in accordance with some predetermined path information. This path information is derived from an expected transmit power level from the command station 10 which is compared at the receiver with the internal reference. However, the actual power output by the command transmitter at the command station 10 is not actually measured and variations therein are not compensated for by the signal strength monitoring at the DAU 14.

The second stage of power leveling provides for a closed loop system at the DAU 14 which measures the actual power output by the data transmitter at the DAU 14 to ensure that an appropriate amount of power is being transmitted which is determined by actually measuring the output power. The third stage of the power leveling provides a closed loop system wherein the actual signal strength received by the command station 10 is measured and, if necessary, adjusted. Therefore, three stages of power leveling have been provided for to ensure that the power received from a plurality of remote transmitters at varying distances from the central station are received at the central station at power levels that are essentially equal to each other, thus minimizing the requirements of adjacent channels for handling large variations in received power levels.

Although the present invention has been described in detail, it should be understood that various changes, substitutions and alterations can be made therein without departing from the spirit and scope of the invention as defined by the appended claims.

What is claimed is:

1. A seismic telemetry system, comprising:
   means for acquiring seismic data at a remote location;
   data link means disposed between said remote location and a central location for carrying encoded data transmissions;
   data transmission means at said remote station for encoding said seismic data and transmitting said encoded seismic data over said data link means as an encoded seismic data transmission, said data transmission means having a variable output power, the output power level determined by a control signal input;
   data receiver means disposed at said central location for receiving said encoded seismic data transmission from said data link means for decoding thereof and generation of decoded seismic data, said data receiver means processing said decoded seismic data;
   command transmitter means disposed at said central location for transmitting periodic command transmissions having a predetermined signal level over said data link means to said remote location;
   command receiver means disposed at said remote location for receiving said command transmissions and measuring the signal strength thereof, said command receiver means determining the path loss in said data link means by comparing the received signal strength with a predetermined reference level corresponding to said predetermined level of said command transmissions transmitted from said central location;
   level storage means for storing an attenuation level at said remote location;
   attenuation means at said remote location for generating said attenuation level for storage in said level storage means, said attenuation level representative of the path loss determined by said command receiver means;
   power level means at said remote location for generating said control signal as a function of the value of said stored attenuation level to vary the output of said data transmission means to generate an expected power output level such that the signal strength received by said data receiver means at said central location is within a predetermined window, said control signal generated in accordance with predetermined operating parameters of said data transmission means;
   detect means for measuring the power output by said data transmission means to said data link means;
   compare means for comparing the measured output power from said detect means with said expected power output level generated by said power level means;
   means for controlling said power level means to offset said control signal if said measured output power from said data transmission means differs from said expected power output level by a predetermined amount;
   receiver detect means disposed at said central location for measuring the signal strength of the received seismic data transmissions;
   means for comparing the measured signal strength of said received seismic data transmission with said predetermined window to determine if the signal strength of said received seismic data transmission is outside of said window;
   means for generating a command offset signal at said central location having encoded therein the amount of offset necessary to place the signal strength of said received seismic data transmissions in said window; and
   means for encoding said command offset signal into said command transmission for transmission to said command receiver means from said central location;
   said command receiver means decoding said command offset and controlling said power level means to offset said control signal by said command offset.

2. The telemetry system of claim 1 wherein said detect means detects the direct power output of said data transmission means.

3. The telemetry system of claim 2 wherein said data transmission means comprises:
   means for receiving said acquired seismic data and encoding said acquired seismic data into a predetermined format;
   a variable power amplifier for receiving said encoded seismic data and outputting said second encoded seismic data at said expected power output level, said expected power output level responsive to said control signal input on a control input, said control sigal determining said expected power output level; and
   an attenuator disposed on the output of said variable power amplifier for inserting additional attenuation between said amplifier and said data link means.

4. A seismic telemetry system with power leveling comprising:
   a command station for controlling the telemetry system and processing data received thereby, said command station having:
      command transmit means for periodically generating a command transmission signal at a predetermined signal strength having command information encoded therein and transmitting said command transmission to the system,
      data receive means for receiving seismic data from the system, and
      processing means for processing the received data;
   a plurality of remote data acquisition stations each having a separate identification code for receiving said periodically generated command transmission add collecting seismic data in response to the command encoded therein, said seismic data encoded into a seismic data transmission, said seismic data transmission for transmission to said command station; and
   data link means disposed between said command station and each of said remote stations for carrying said command transmission from said command station to each of said remote stations and carrying said seismic data transmission from each of said remote stations to said command station, said data link means having a transmission loss associated therewith;
   said remote stations each having:
      command receive means for receiving said command transmission and decoding the command information encoded therein,
      signal strength means for measuring the signal strength of said common transmission, data acquisition means for collecting seismic data, data transmission means nominally operating at a predetermined output level for encoding said collected data into a seismic data transmission and transmitting said seismic data transmission to said command station over said data link means, level storage means for storing an attenuation level, power control means for varying the signal strength output by said data transmission means from said predetermined output level by a value corresponding to the attenuation level stored in said level storage means, control processor means for comparing the measured signal strength of said command transmission with a predetermined reference value, said predetermined reference value dependent upon said predetermined signal strength of said command transmission at said command station, said control processor means calculating the loss of said data link means between said command station and the associated one of said remote stations, said control processor means generating said attenuation level in accordance with the calculated loss and storing said attenuation level in said level storage means to compensate for the transmission loss of said data link means such that the signal strength of said data transmission received at said command station is within a predetermined signal strength window when said power control means attenuates the signal strength output by said data transmission means;

said command station further comprising:

signal strength detect means for measuring the signal strength of said received seismic data transmission from each of said remote stations, means for comparing said measured signal strength With a predetermined reference to determine the variation of said measured signal with respect to said predetermined reference, said variation indicating that said received seismic data transmission is in said predetermined window, and means for calculating an offset when said received signal strength is outside of said predetermined window and generating a command transmission encoded with said offset for transmission to the associated one of said remote stations;

said control processing means of the associated one of said remote stations further comprising means for offsetting said predetermined reference by said command offset, said command offset allowing said command station to control each of said remote stations to vary the output signal strength of said data transmission in response thereto.

5. The seismic telemetry system of claim 4 wherein the loss of said data link means varies as a function of the distance between each of said remote stations and said command station.

6. The seismic telemetry system of claim 4 wherein said command transmission and said seismic data transmissions are modulated RF carriers and said data link means comprises a radio frequency transmission medium.

7. A seismic telemetry system with power leveling, comprising:

a command station for controlling the telemetry system and processing data received thereby, said command station having:

command transmit means for periodically generating a command transmission signal at a predetermined signal strength having command information encoded therein and transmitting said command transmission to the system, said command information containing attenuation data and associated remote station identification data, data receive means for receiving seismic data from the system, signal strength detect means for measuring the signal strength of said received seismic data transmission from each of said remote stations, means for comparing said measured signal strength with a predetermined reference, said predetermined reference indicating that said received seismic data transmission is in said predetermined window, means for calculating an offset when said received signal strength is outside of said predetermined window and altering said attenuation data with said offset for transmission to the associated one of said remote stations, and processing means for processing the received data;

a plurality of remote data acquisition stations each having an associated identification code for receiving said periodically generated command transmission and collecting seismic data in response to the command information encoded therein, said seismic data encoded into a seismic data transmission, said seismic data transmission for transmission to said command stations; and data link means disposed between said command station and each of said remote stations for carrying said command transmission from said command station to each of said remote stations and carrying said seismic data transmission from each of said remote stations to said command station, said data link means having a transmission loss associated therewith;

said remote stations each having:

command receive means for receiving said command transmission and decoding the command information encoded therein to receive said attenuation data associated with said identification code, data acquisition means for collecting seismic data, data transmission means nominally operating at a predetermined output level for encoding said collected data into a seismic data transmission and transmitting said seismic data transmission to said command station over said data link means, level storage means for storing an attenuation level, said attenuation level nominally equal to a level corresponding to said nominal operating level of said data transmission means, power control means for varying the signal strength output by said data transmission means from said predetermined output level by a value corresponding to the attenuation level stored in said level storage means, and control processor means for receiving said attenuation data and offsetting said stored attenuation level in response thereto.

8. The seismic telemetry system of claim 7 wherein said command transmission and said seismic data transmissions are modulated RF carriers and said data link means comprises a radio frequency transmission medium.

9. The seismic telemetry system of claim 7 wherein each of said remote stations further comprise:
   signal strength means for measuring the signal strength of said command transmission;
   said control processor means comparing the measured signal strength of said command transmission with a predetermined reference value, said predetermined reference value dependent upon said predetermined signal strength of said command transmission at said command station, said control processor means calculating the loss of said data link means between said command station and the associated one of said remote stations, said control processor means generating a new attenuation level in accordance with the calculated loss and storing said new attenuation level in said level storage means at said attenuation level to compensate for the transmission loss of said data link means such that the signal strength of said data transmission received at said command station is within a predetermined signal strength window when said power control means attenuates the signal strength output by said data transmission means.

10. The seismic telemetry system of claim 9 where each of said remote stations further comprises:
   power detect means for detecting the actual output signal strength of said data transmission means; and
   said control processor means receiving the output of said power detect means and generating an offset to said stored attenuation level in said level means to compensate for variations in said data transmission means that vary from said predetermined output level.

* * * * *